United States Patent
Evans et al.

(10) Patent No.: US 7,337,316 B1
(45) Date of Patent: Feb. 26, 2008

(54) PACKET AUTHENTICATION

(75) Inventors: Paul A Evans, Ipswich (GB); Mark A Butler, Ipswich (GB)

(73) Assignee: British Telecommunications public limited company, London (GB)

( * ) Notice: Subject to any disclaimer, the term of this patent is extended or adjusted under 35 U.S.C. 154(b) by 681 days.

(21) Appl. No.: 10/049,844

(22) PCT Filed: Aug. 30, 2000

(86) PCT No.: PCT/GB00/03338

§ 371 (c)(1),
(2), (4) Date: Feb. 19, 2002

(87) PCT Pub. No.: WO01/20872

PCT Pub. Date: Mar. 22, 2001

(30) Foreign Application Priority Data

Sep. 16, 1999 (EP) .................................. 99307363

(51) Int. Cl.
*H04L 9/00* (2006.01)
(52) U.S. Cl. .................... 713/162; 380/262; 726/13
(58) Field of Classification Search ........ 713/160–162; 380/262
See application file for complete search history.

(56) References Cited

U.S. PATENT DOCUMENTS

| | | | | | |
|---|---|---|---|---|---|
| 4,965,827 A | * | 10/1990 | McDonald | .................. | 713/161 |
| 5,109,384 A | * | 4/1992 | Tseung | ..................... | 714/748 |
| 5,151,899 A | * | 9/1992 | Thomas et al. | ............. | 370/394 |
| 5,455,865 A | * | 10/1995 | Perlman | ..................... | 713/153 |
| 5,521,732 A | * | 5/1996 | Nishio | .......................... | 398/51 |
| 5,541,995 A | * | 7/1996 | Normile et al. | .............. | 380/42 |
| 5,557,676 A | * | 9/1996 | Naslund et al. | ............. | 380/247 |
| 5,712,627 A | * | 1/1998 | Watts | ........................ | 340/5.81 |

FOREIGN PATENT DOCUMENTS

| | | |
|---|---|---|
| EP | 0825745 A | 2/1998 |
| WO | WO 97 26730 A1 | 7/1997 |
| WO | WO 99 21340 A | 4/1999 |

OTHER PUBLICATIONS

International Search Report—Mar. 30, 2001.

* cited by examiner

*Primary Examiner*—Gilberto Barrón, Jr.
*Assistant Examiner*—Laurel Lashley
(74) *Attorney, Agent, or Firm*—Nixon & Vanderhye P.C.

(57) ABSTRACT

A data packet is conveyed between servers connected to a packet network. A first server securely distributes a list of distinct numbers to one or more authorized receiving servers. Subsequently, upon receiving a packet to be transferred, the first server selects an unused number from the number list and writes the number into the packet before routing the packet to one or more of the authorized receiving servers. Upon receipt of the packet, an authorized receiving server checks that the number included in the packet is valid in that it is both contained in the latest number list and has not already been used in another packet. If valid, the receiving server determines a sequence number representative of the position of the number in the latest number list and sends an acknowledgement message to the originating server, including the determined sequence number. The originating server checks the sequence number to verify the authenticity of the acknowledgement message, re-sending the packet if invalidly acknowledged.

21 Claims, 3 Drawing Sheets

PACKET AUTHENTICATION

This application is the U.S. national phase of international application PCT/GB00/03338 filed Aug. 30, 2000 which designated the U.S.

BACKGROUND

1. Technical Field

This invention relates to a method of operating a packet network and finds particular application in controlling the transfer of data packets over a packet network.

2. Related Art

It has become increasingly important to ensure that adequate security is in place to protect the infrastructure and applications operating over public data networks from attack by unauthorised users. Without adequate security, false information may be transmitted to users of the network or, potentially, operation of the network infrastructure may be severely disrupted.

A data source connected to a packet network may send data packets to one or more recipients using one of a number of data transport methods. In packet network terminology, sending a packet to a single recipient is known as uni-casting, the data packet being specifically addressed for that recipient. Sending a packet to all possible recipients is known as broadcasting, a special address being used to ensure that the packet is distributed to all users connected to the network, or to at least a part of the network. Sending a packet to a subset of all possible recipients, in particular to those recipients who have elected to receive packets as members of one or more addressable groups, is referred to as multi-casting. Such groups are referred to as multi-cast groups.

In a known multi-casting arrangement there may be a number of multi-cast groups available to which a potential recipient may subscribe to receive data packets. Each multi-cast group is assigned a unique multi-cast address so that a data packet addressed to a particular multi-cast address will be delivered to all recipients subscribing to that multi-cast group. A hierarchy of so-called "caching servers" may be connected to a packet network for the purpose of routing information from an information source, such as a "publish & subscribe" news service, to one or more specified multi-cast addresses (groups). A caching server may be a conventional server computer with one or more interfaces to the packet network, arranged to operate using known transport protocols such as TCP/IP and/or a multi-casting protocol such as the Internet Group Management Protocol (IGMP) Version 2 as defined in Internet Request for Comment (RFC) 2236, published on the Internet by the Internet Engineering Task Force (IETF). In order for data packets to be correctly transferred by the caching servers, each caching server is configured to forward a received data packet to one or more predetermined network destinations, other caching servers in the hierarchy or servers providing end users with access to a multi-casting session for example, according to the location of subscribers to those multi-cast groups. Preferably, packets are sent only once to each destination and a caching server will only replicate a packet when required to do so. In this way, the number of packets required to be sent in order to distribute a given set of information to a group of users is greatly reduced, at all but the final stage of delivery to a user, in comparison with that required to uni-cast the information set from the source to each of those users separately.

However, known multi-casting arrangements are inherently insecure in their method of transferring data. The primary purpose of a multi-cast caching server infrastructure is to disseminate information to subscribing destinations. A network of multi-cast caching servers will generally convey any correctly addressed data packet received by it. It is therefore possible for an unauthorised user to transmit false messages over multicast addresses in the hope that caching servers will faithfully propagate those messages.

Known security techniques for use in multi-casting arrangements are of two main types: those that protect the content of data packets and those that authenticate the source of data packets. Those measures designed to protect the content of data packets, against alteration for example, are implemented typically at the application level by information service providers, for example using known data encryption techniques. However, such application level security measures do not generally prevent distribution by caching servers at the transport level of data packets originating from other, potentially rogue sources. In a multi-casting network arrangement any user may send data packets over a valid multi-cast address.

A known technique that may be used to both authenticate the source of data packets and to enable unauthorised changes to the content of those data packets to be detected is to encode a digital signature into each packet. A recipient caching server may decode the signature in each received packet and decide, on the basis of the apparent validity of the packet, whether or not to forward the packet. An example of a known digital signature technique is PGP™ as described in RFC 1991, published on the Internet by the Internet Engineering Task Force (IETF) Network Working Group. However, encoding and decoding digital signatures for every packet to be sent and received respectively adds a considerable and undesirable overhead to the processing required to route packets, in a multi-casting arrangement in particular.

BRIEF SUMMARY

According to a first aspect of the present invention, there is provided a method of conveying a data packet over a packet network from a first server to one or more authorised recipient servers, the method comprising the steps of:
(i) at a first server, storing a list comprising one or more distinct data elements;
(ii) sending a copy of said list to an authorised recipient server by secure communication means;
(iii) selecting an unused data element from said list and including said selected data element in a data packet to be sent; and
(iv) sending said data packet to said authorised recipient server.

In this aspect, the source of a data packet may be authenticated with a reasonable degree of security without the data processing overhead inherent in digital signature techniques. The authentication technique of the present invention is not required to protect the content of a data packet against alteration, only to provide an indication that the packet was sent by a valid first server. The data processing involved at a first server in selecting a data element from a stored list and including the data element in a data packet before sending it is potentially very small. Method steps (iii) and (iv) may be repeated in respect of each subsequently received packet to be forwarded, until all data elements in the list sent at step (ii) have been used or until a predetermined minimum number of data elements remain unused. At this point, a further list of data elements may be stored or otherwise obtained and a copy of the further list sent to authorized recipients according to method steps (i) and (ii), before forwarding further packets.

Any known method of secure transmission may be used to convey the list of data elements to an authorised recipient. For example, an encryption technique such as PGP, as referenced above, may be used. However, it is important that a list of data elements is not made available to other than authorised recipients, otherwise the authentication method provided by this invention may be compromised by an unauthorised user.

Preferably, selection of a data element from a stored list, at method step (iii), may be made at random. As will be explained below in relation to acknowledging receipt of data packets, it is important that an unauthorised user is not able to easily predict either the next data element to be selected from the list or the position within the list of a selected data element.

Preferably, the selected data element may be hashed with the content of the data packet using a known hashing technique. In this way the included data element is not immediately visible to an unauthorised user monitoring data packets, increasing the security of the method.

According to a second aspect of the present invention, there is provided a method of conveying a data packet over a packet network from a first server to one or more authorised recipient servers, the method comprising the steps of:
(a) at an authorised recipient server, receiving, by secure communication means, a list comprising one or more data elements, and storing said list;
(b) receiving a data packet including a data element;
(c) sending a message acknowledging receipt of said data packet if said included data element is contained within said stored list and was not included in an earlier received data packet.

In this second aspect, an authorised receiving server may be arranged to operate in co-operation with a first server operating in accordance with the first aspect, to receive data packets and to check that they originate from a valid source—in this case the first server. A data packet may be shown to originate from a valid source if it includes a data element contained in the latest received list of data elements and if the data element included in the packet was not included in an earlier received data packet. This latter check helps to guard against the possibility that an unauthorised user intercepts a data packet, reads the data element included therein and reuses the data element in a rogue packet sent shortly afterwards. If two or more data packets are detected at the authorised recipient server including the same data element, for example within a given period of time or among a given number of received packets, all such packets may be ignored as potentially invalid with no acknowledgement message being sent in respect of any of them.

Preferably, if two or more data packets are received at an authorised recipient server including the same data element, then the data content of the packets are compared. If the content of the received packets is found to be the same, then one of the received packets may be selected as valid and an acknowledgement message sent, the other packet or packets being harmless duplicates arising under known circumstances within the packet network.

Having established that a received data packet originated from a valid source, an authorised recipient server is arranged to send an acknowledgement message to the source of the data packet, for example using a uni-casting method of transmission. Preferably, the acknowledgement message includes a sequence number indicative of the position of the included data element within the stored list as a verifiable indication that the acknowledgement message originated from an authorised recipient—one holding the latest copy of the earlier-distributed list of data elements.

Preferably, the acknowledgement message contains an identifier for the authorised recipient server to enable the sender of the acknowledgement message to be identified by a first server.

Preferably, the method according to the first aspect includes the further steps of:
(v) receiving an acknowledgement message including a sequence number;
(vi) identifying the position within said list of said selected data element from step (iii);
(vii) comparing said sequence number with said identified position; and
(viii) re-sending said data packet to said authorised recipient server if, at step (vii), said sequence number does not match said identified position.

In this way, a first server may operate to check that an earlier sent data packet has been received by an authorised recipient server and may verify that a corresponding acknowledgement message originated from that authorised recipient server. If there is doubt about the source of a received acknowledgement message, then the data packet may be resent.

Preferably, if an acknowledgement message is not received within a predetermined time period after sending the data packet at step (iv), the data packet is resent to the authorised recipient server. This helps to overcome the possibility that an unauthorised user may try to take advantage of a lost packet to transmit a rogue data packet. Rapid re-sending of an unacknowledged or invalidly acknowledged data packet minimises the time available for an unauthorised user to detect packet loss and introduce a rogue packet. It also increases the likelihood that a valid packet is received by a authorised recipient at more or less the same time as a rogue packet including the same data element, reducing the chances that a rogue packet will be accepted as valid by that recipient.

According to a third aspect of the present invention, there is provided a server, arranged to convey data packets over a packet network, the server having:
a packet network interface;
a store for storing a list comprising one or more distinct data elements;
secure communication means for sending a copy of said stored list to a predetermined destination;
selecting means operable to select an unused data element from said stored list and to include said selected data element in a data packet to be sent; and
routing means operable to send said data packet to said predetermined destination via said interface.

According to fourth aspect of the present invention there is provided a server, arranged to convey data packets over a packet network, the server having:
a packet network interface;
secure communication means for receiving a list comprising one or more data elements;
a store for storing said received list; and
acknowledging means operable, on receipt of a data packet including a data element, via said interface, to send a message acknowledging receipt of said data packet if said included data element is contained within said stored list and if said included data element was not included in an earlier received data packet.

While the present invention finds particular application with multi-casting arrangements involving a hierarchy of participating caching servers, the packet authentication method of the present invention may be applied to communication between servers in any other network arrangement or network type requiring a "lightweight" packet authentication technique that will not impose undesirable overheads on packet routing, while providing a reasonable degree of certainty as to the origin of data packets and as to their successful delivery. Consideration of overhead processing is a particular concern in multi-casting arrangements because a number of caching servers may be involved in conveying a data packet from a source to a set of one or more destinations over a multi-cast address. Packet authentication would generally be required to operate on a link by link basis, between each respective pair of caching servers of a hierarchy in a data path, rather than from only the ends of the path. An excessive processing overhead imposed at each stage would add considerably to overall packet delay and reduce the throughput of servers.

BRIEF DESCRIPTION OF THE DRAWINGS

There now follows, by way of example only, a description of specific embodiments of the present invention. This description is to be read in conjunction with the accompanying drawings, of which.

DETAILED DESCRIPTION OF EXEMPLARY EMBODIMENTS

Figure 1B:
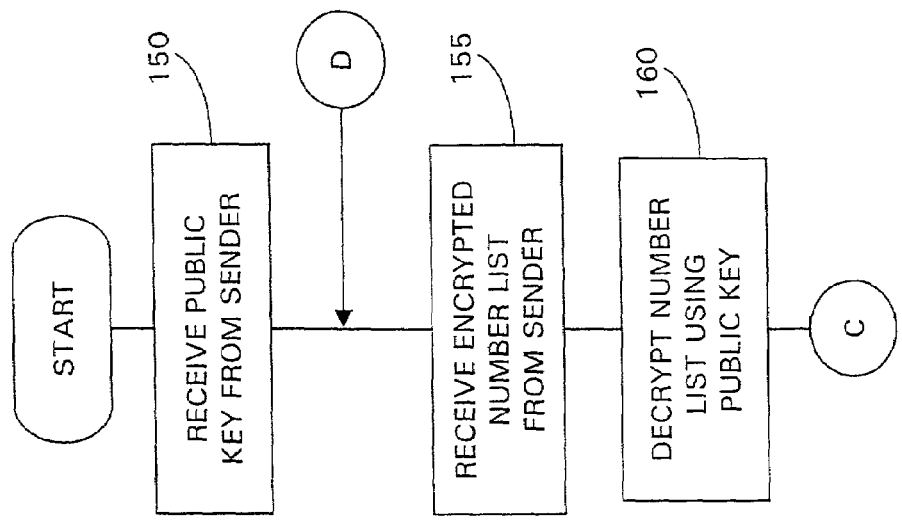
FIGS. 1A and 1B are flow diagrams showing initial sequences of steps in a method according to embodiments of the present invention for sending and receiving respectively.
Figure 1A:
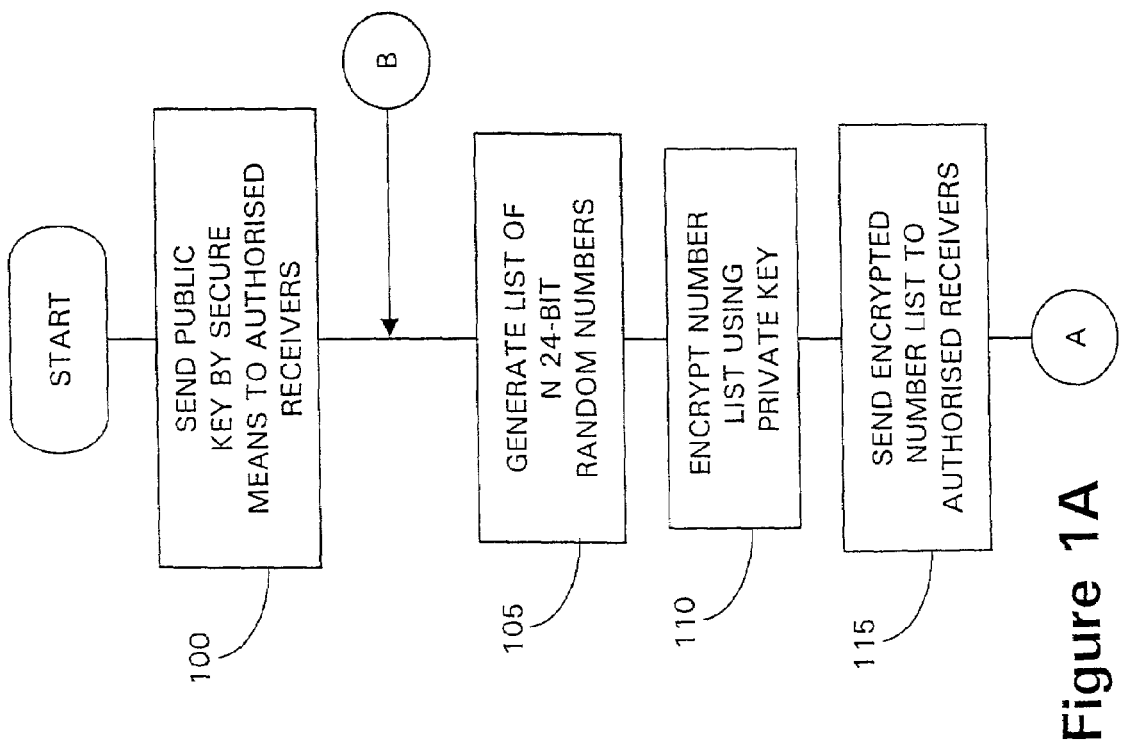

Referring to FIGS. 1A and 1B, two flow diagrams are presented, FIG. 1A showing the initial steps in operation of a first server to enable packets to be routed under the control of a packet authentication method according to embodiments of the present invention, FIG. 1B showing the initial steps in operation of a recipient server, co-operating with the first server, to enable packets routed by the first server to be received and verified as originating from the first server. In the particular embodiment to be described, an encryption technique based upon public and private encryption keys is used during the initial processing steps shown in FIGS. 1A and 1B, using PGP for example as referenced above, although any secure method for transmitting data may be used.

Referring to FIG. 1A, the process begins at STEP 100 with the first server sending its public encryption key to one or more authorised recipient servers. Authorised recipient servers are those likely to receive data packets routed from the first server in due course. The technique of sending an encryption key may involve several stages of interaction between the sender and the receiver of the key to ensure that the public key is transferred securely. Such techniques for key exchange are well known in the art.

Having distributed its public key, then at STEP 105 the first server generates a list of one or more distinct 24-bit random numbers. In practice, generating only a single random number at this stage would be very inefficient, and ineffective as regards acknowledgement, as will become clear. Preferably, the number of bits used to represent each random number and the number of numbers generated for a particular list are chosen to ensure that the probability of an unauthorised user guessing a valid number from among those generated is small. If a 24-bit representation is selected, for example, then more than 16.7 million numbers may be represented whereas perhaps only 1000 of those possible numbers may actually be used in a particular list.

At STEP 110, the first server encrypts the generated number list using its private encryption key before, at STEP 115, sending the encrypted number list to the one or more authorised recipient servers. Preferably, the generated number list may fit into and be sent as a single data packet, avoiding potential problems that might arise from packet loss if the list occupied more than one packet.

Referring to FIG. 1B, the corresponding steps in operation of an authorized recipient server begin at STEP 150 with receiving the public encryption key sent by the first server at STEP 100. As discussed above in relation to STEP 100, this initial step may involve several interactions with the first server to ensure secure transfer of the public key. At STEP 155, the encrypted number list is received as sent by the first server at STEP 115. At STEP 160 the recipient server decrypts the number list using the earlier-received public encryption key and is thereafter ready to receive data packets from the first server.

Figure 2A:
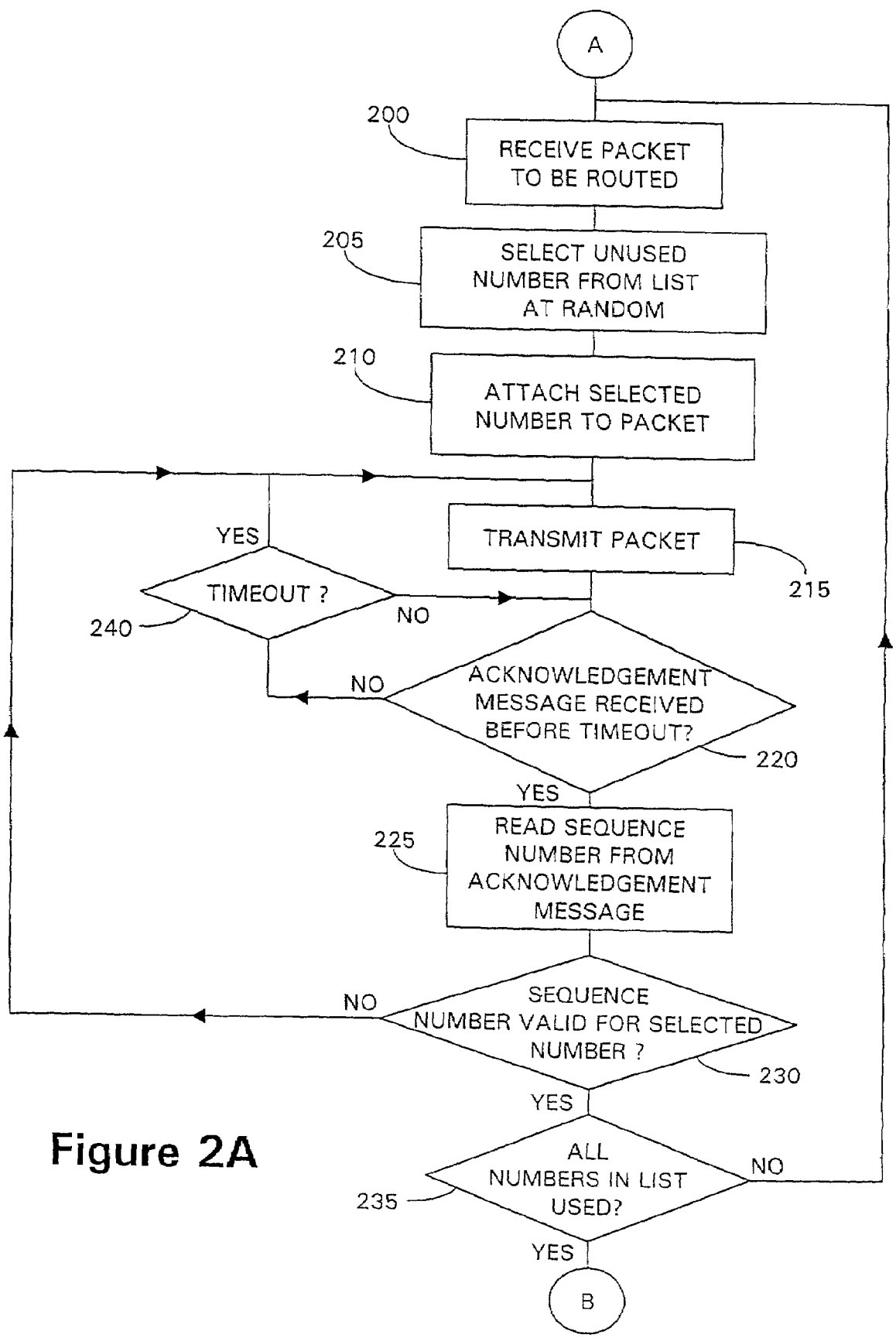
FIGS. 2A and 2B are flow diagrams showing further sequences of steps in a method according to embodiments of the present invention for sending and receiving respectively.
Figure 2B:
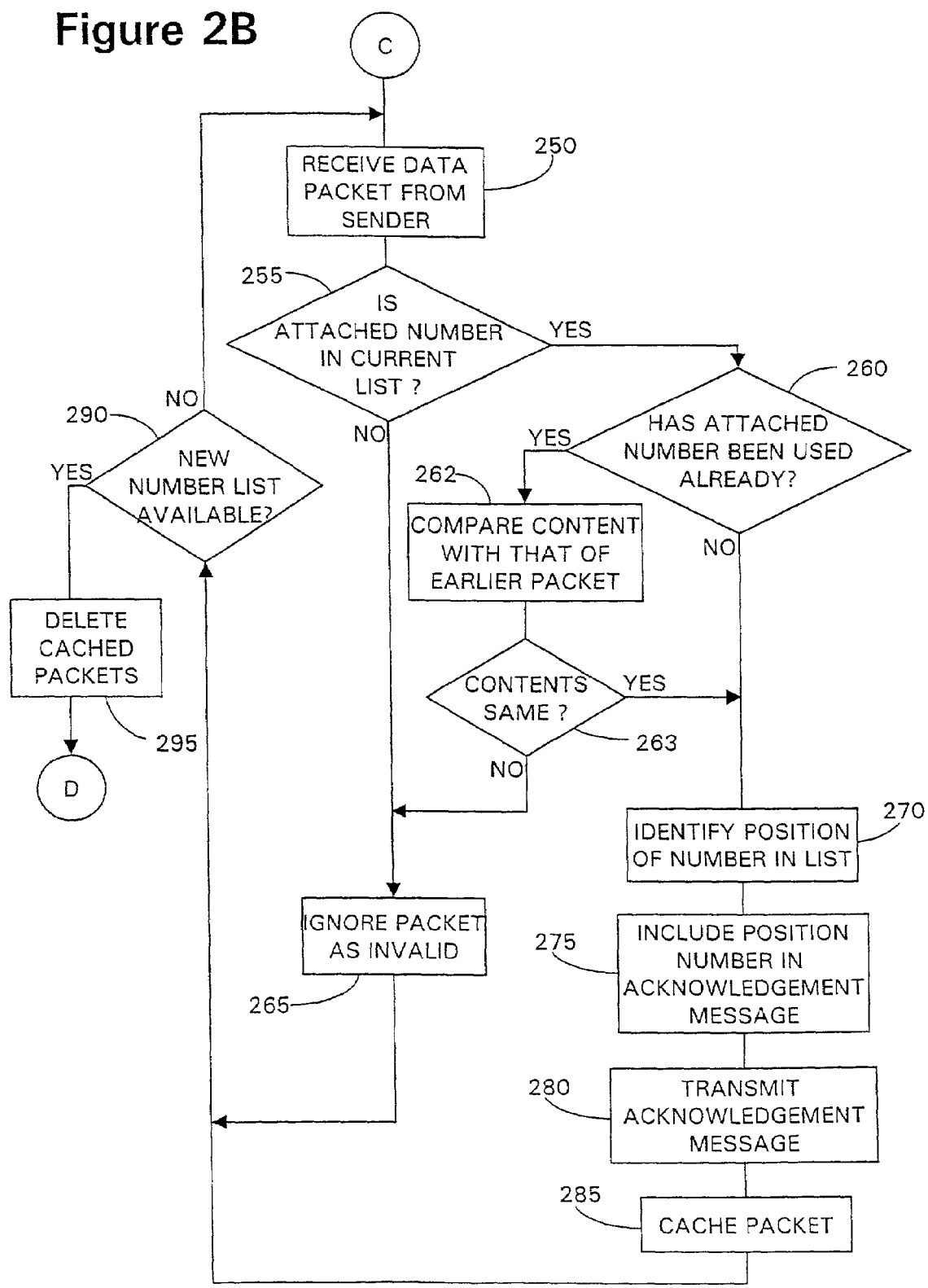

Referring to FIG. 2, two flow diagrams are presented. FIG. 2A shows the steps in operation of the first server in routing a received packet to one or more of the authorised recipient servers. Processing steps shown in FIG. 2A begin following distribution of the encrypted number list by the first server at STEP 115 of FIG. 1A. FIG. 2B shows the corresponding steps in operation of one of the authorised recipient servers in receiving the packet routed by the first server and in verifying the packet's authenticity. Processing by the recipient server according to FIG. 2B begins following decryption of the received number list at STEP 160 of FIG. 1B.

Referring to FIG. 2A, beginning at STEP 200, the first server receives a packet to be routed. At STEP 205, the first server selects, from the number list generated at STEP 105, a number not previously selected. Preferably, selection may be made at random to help prevent an unauthorised user predicting the position of the selected number within the list. However, other selection methods may be used. At STEP 210, the first server attaches the selected number to the packet to be routed. Preferably, the selected number may be inserted into a predetermined position in a header of the packet or, alternatively, hashed with all or a part of the content of the packet. At STEP 215 the first server routes the packet, according to predetermined routing conditions, to one or more of the authorised recipient servers. At STEP 220, the first server then tests for receipt, before the expiration of a timeout period, of an acknowledgement message from each of the one or more recipient servers. The timeout period is controlled by means of a timeout test at STEP 240 and may preferably be made very short. Preferably, the timeout period may be set according to the re-transmission timeout algorithm used by TCP/IP, as described in "TCP/IP Illustrated, Volume 1: The Protocols" (Addison-Wesley Professional Computing Series) by W. Richard Stevens, at page 297. If, at STEP 240, the timeout period is reached and no acknowledgement message has been received from an intended recipient server, then at STEP 215 the first server re-sends the packet to the respective intended recipient, incorporating the same selected number from the number list in the packet.

Use of a short timeout period helps to overcome a possible opportunity for an unauthorised user to transmit its own rogue packet in the event that a transmitted packet by the first server is lost. An unauthorised user might monitor the progress of packets, copying the selected number from each packet so that, in the event that one of those packets does not reach its intended destination, the unauthorised user may attach the corresponding number to its own rogue packet and so attempt to trick the intended recipient server into accepting the rogue packet, acknowledging it and propagating it. Such processing by an unauthorised user may take longer than the timeout period employed at STEP 240 of FIG. 2A. Re-transmission of the lost packet by the first server would then result in two packets being received by the recipient having the same attached number. As discussed below, a comparison of their differing content would be indicative of a security breach and appropriate steps may be taken, for example to ensure re-transmission of the packet by the first server but, for example, using a different selected number from the latest number list.

In practice, because of the typically short distance between the first server and an authorised recipient server, it is unlikely that many packets would be lost by the network.

As will be described below with reference to FIG. 2B, when an authorised recipient server receives a packet that it believes to have been validly transmitted by the first server from STEP 215 of FIG. 2A, the recipient server generates a message to acknowledge receipt of the packet, into which is inserted, in a predetermined way, a sequence number indicative of the position in the latest number list of the attached number. On receipt of such an acknowledgement message at STEP 220, the first server reads, at STEP 225, a sequence number inserted into the acknowledgement message. At STEP 230 the first server checks that the sequence number in the acknowledgement message corresponds to the position of the originally selected number in the number list. If the sequence number is invalid then the acknowledgement message is deemed invalid, having been generated, potentially, by an unauthorised recipient server, or by an authorised recipient server but in respect of a rogue packet that happened to contain a valid attached number. Authorised recipient servers possess the latest number list and can therefore correctly determine the position of a valid attached number in that list. If the acknowledgement message is deemed invalid, then at STEP 215 the first server immediately re-transmits the unacknowledged packet.

If, at STEP 230, the acknowledgement message contained a valid sequence number, then at STEP 235, if all the numbers in the list generated at STEP 105 have been selected and used in routed packets, or if the list is close to being exhausted, then processing within the first server returns to STEP 105 of FIG. 1A to execute steps to generate and distribute a new list of random numbers before any further packets may be routed. Otherwise processing returns to STEP 200 ready to receive further packets.

As mentioned above, generating a trivially small list of numbers at STEP 105 of FIG. 1A, comprising only a single number for example, would dramatically and unnecessarily increase the overhead associated with this process. In that case, steps 105 to 115 would need to be executed by the first server for every packet to be routed. Thus it is preferable for a list of significantly more than one number to be generated at each execution of STEP 105, preferably comprising at least several hundred numbers. A relatively small number of numbers in a list would also increase the probability that an unauthorised user, having monitored acknowledgement messages and noted sequence numbers used, would be able to predict a sequence number for a subsequent attached number and to generate a false but otherwise valid acknowledgement message.

Referring to FIG. 2B, steps in operation of an authorised recipient server will now be described, operating in co-operation with a first server itself operating in accordance with FIG. 2A. Beginning at STEP 250, the recipient server receives a data packet. At STEP 255, a number found attached to the packet, for example at a predetermined position within the packet header, is read and a check is performed to ensure that the attached number is included in the latest number list, received at STEP 155. If the attached number is not included in the list, then the packet is deemed to originate from an invalid source and is ignored at STEP 265, no further action being taken by the recipient server with respect to that packet other than, preferably, to send an alert message to a system administrator or to the first server regarding possible attempts by an unauthorised user to transmit invalid packets. However, if the attached number is located within the list at STEP 255, then at STEP 260 a further check is made to ensure that the attached number has not already been used with an earlier packet. An attached number found to be already used indicates either that the packet is a harmless duplicate of the earlier packet or that the attached number has been attached to a packet originating from a potentially rogue source. Therefore, if at STEP 260 the attached number has been used in another packet, then at STEP 262 the data content of the respective packets is compared. If, at STEP 263, the data content of the packets is the same, then the second packet is confirmed as a harmless duplicate and processing proceeds to STEP 270. If the contents differ, then one or other of the respective packets is likely to be invalid and, preferably, at STEP 265, both packets are ignored.

If, at STEP 260, the attached number has not already been used, then at STEP 270 a sequence number is calculated, indicative of the position of the attached number in the latest number list. At STEP 275, an acknowledgement message is generated including the sequence number and, preferably, the identity of the recipient server, the sequence number preferably being hashed with the message using a predetermined hashing algorithm. At STEP 280 the acknowledgement message is transmitted to the first server, by a unicasting technique for example, to indicate receipt of the packet. The sequence number included in the acknowledgement message may be used by the first server to verify, by the steps 225 and 230 described above with reference to FIG. 2A, that the acknowledgement message originated from an authorised packet recipient holding a copy of the latest number list.

Rather than routing a particular packet to each of a plurality of destinations using the same attached number, the first server may alternatively be arranged either to select a number from a different number list in respect of each destination for the packet, or to select a different number from the same list in respect of each destination for the packet. In this way, inclusion in an acknowledgement message of an identifier for the respective authorised recipient may be unnecessary as the validity of each acknowledging recipient would be apparent from the validity of their respectively calculated sequence numbers.

Having received and acknowledged receipt of a valid packet, the recipient server may, at STEP 285, cache the packet for the purposes of comparison of its content with that of later-received packets, where STEP 262 applies. A separate caching store may be used to cache the packet for subsequent forwarding to another server using a similar authentication technique as described above.

Following either a successful receipt and caching of a packet at STEP 285 or rejection of a packet at STEP 265, before checking for receipt of further packets from the first server, a check is made at STEP 290 for availability of a new number list. If the latest number list has been exhausted by the first server, or if only a predetermined minimum number of unused numbers remain, a new number list would be generated and transmitted by the first server according to the steps of FIG. 1A, either before or at the same time as further packets are being routed. If a new number list is available, then the recipient server firstly, at STEP 295, deletes all packets cached (for the purposes of content comparison) at STEP 285 before proceeding to execute the steps of FIG. 1B, beginning at STEP 155, to receive and to decrypt the new number list.

It will be appreciated by a skilled person that the number list need not necessarily comprise randomly generated numbers. The only preferred requirement is that the generated numbers within the list are distinct. The subsequent random selection of numbers at STEP 205 of FIG. 2A provides a substantially equivalent effect as regards random number selection whether or not the generated numbers are randomly generated. However, random generation of numbers in addition to random selection does minimise the possibility of an unauthorised user predicting, from observation of numbers used by the first server, the next likely number to be used and hence to use the predicted number to transmit a rogue packet into the system of servers.

An alternative but less efficient method for generating acknowledgement messages may be used in which authorised recipient servers generate their own number lists and distribute them to potential senders of packets. In that case, similar initial processing steps to those shown in FIG. 1A would be executed by potential packet receiving servers and those in FIG. 1B by potential packet transmitting servers. Thereafter, in FIG. 2B, instead of determining a sequence number at STEP 270, the recipient server would select a number from its latest number list for inclusion in the acknowledgement message. The first server would then be required to perform a similar verification step to that performed by the recipient server at STEP 255 to check that the number included in the acknowledgement message was included in the latest number list distributed by the respective recipient server.

What is claimed is:

1. A method of conveying a data packet over a packet network from a first server to one or more authorized recipient servers, the method comprising:
   (i) a first server, storing a list comprising one or more non-duplicated random numbers;
   (ii) sending a copy of said list to an authorized recipient server by secure communication means;
   (iii) selecting a number from said list of stored random numbers and including said selected random number in a data packet to be sent to said authorized recipient server wherein said selected random number has not previously been selected and included in a data packet to be sent; and
   (iv) sending said data packet to said authorized recipient server.

2. A method according to claim 1, further including:
   (v) receiving an acknowledgement message including a sequence number;
   (vi) identifying the position of said selected random number within said list of stored random numbers from step (iii);
   (vii) comparing said received sequence number with said identified position; and
   (viii) re-sending said data packet to said authorized recipient server if, at step (vii), said sequence number does not match said identified position.

3. A method according to claim 2, wherein, at step (v), if said acknowledgement message is not received within a predetermined time period after sending said data packet at step (iv), said data packet is resent to said authorized recipient server.

4. A method of conveying a data packet over a packet network from a first server to one or more authorized recipient servers, the method comprising:
   (a) receiving by secure communication means at an authorized recipient server, a list comprising one or more unique non-duplicated random numbers, and storing said list;
   (b) receiving at the authorized recipient server a data packet including a random number that is included in said list of authentic;
   (c) sending a message acknowledging receipt of said data packet if said received included number is contained within said stored list of one or more non-duplicated random numbers and if said included number was not included in an earlier received data packet.

5. A method according to claim 4, wherein, at step (c), said acknowledgement message includes a sequence number indicative of the position of said included number within said stored list.

6. A server, arranged to convey data packets over a packet network, the server comprising:
   a packet network interface;
   a store for storing a list comprising one or more non-duplicated random numbers;
   secure communication means for sending a copy of said stored list to a predetermined destination;
   selecting means operable to select a number from said stored list of random numbers and to include said selected random number in a data packet to be sent wherein said selected random number has not previously been selected and included in a data packet to be sent; and
   routing means operable to send said data packet to said predetermined destination via said interface.

7. A server according to claim 6, further comprising:
   acknowledgement means operable, on receipt of an acknowledgement message including a sequence number, to trigger said routing means to re-send said data packet if said sequence number does not match the position of said selected random number within said stored list.

8. A server according to claim 6 further comprising:
   timeout means operable to trigger said routing means to re-send said data packet if a message acknowledging receipt of said data packet is not received within a predetermined time period after sending of said data packet by said routing means.

9. A server according to claim 7, further comprising:
   alerting means to generate an alert message in the event that said data packet is re-sent.

10. A server, arranged to convey data packets over a packet network, the server comprising:
    a packet network interface;

secure communication means for receiving a list comprising one or more non-duplicated random numbers;

a store for storing said received list; and acknowledging means operable, on receipt of a data packet including a number that is included in said list if authentic, via said interface, to send a message acknowledging receipt of said data packet if said included number is contained within said stored list and if said included number was not included in an earlier received data packet.

11. A server according to claim 10, wherein said acknowledging means includes inserting means operable to include a sequence number in said acknowledgement message, said sequence number being indicative of the position of said included number within said stored list.

12. A method for reducing the possibility that an unauthorized data packet is conveyed over a network of interconnected servers in a packet data communication network, said method comprising:

generating a list of unique data values and storing said list at a first server;

securely sending a copy of said list to at least one other server authorized to communicate data packets with said first server and also locally storing said received copy at said at least one other server;

including at least one selected not previously used member of said stored list of data values in an authorized data packet being sent from a sending server to a receiving server; and accepting a received data packet at a receiving server only if said included data value is present in said locally stored list and has not been previously used.

13. A method as in claim 12 wherein said unique data values in the list are random data values.

14. A method as in claim 12 wherein said included member of the list is selected from a random position in the list.

15. A method as in claim 12 wherein:

said unique data values in the list are random data values; and said included member of the list is selected from a random position in the list.

16. A method as in claim 12 wherein the receiving server sends back to the sending server acknowledgement data for an accepted data pager identifying the position of the accepted packet's included data value in said list.

17. A method as in claim 16 wherein the sending server re-sends a data packet if its acknowledgement data does not correctly identify the position of its included data value in said list.

18. A method as in claim 16 wherein the sending server re-sends a data packet if correct acknowledgement data is not received within a pre-determined time after being earlier sent.

19. A method as in claim 1 further comprising, at a receiving server:

(v) comparing at least some of a received data packet to a locally stored list of non-duplicated random numbers; and (vi) if said comparing finds a matched random number, then checking to see if that matched random number has been previously used and, if not, identifying the position of the matched number in said list and sending an acknowledgment message back to the packet sender including data identifying the position of the matched number in said list.

20. A server as in claim 6 further comprising:

means for comparing at least some of a received data packet to a locally stored list of non-duplicated random numbers; and means for checking to see if a matched random number has been previously used and, if not, identifying the position of the matched number in said list and sending an acknowledgement message back to the packet sender including data identifying the position of the matched number in said list.

21. A method as in claim 12 further comprising:

comparing at least some of a received data packet to a locally stored list of non-duplicated random numbers; and if said comparing finds a matched random number, then checking to see if that matched random number has been previously used and, if not, identifying the position of the matched number in said list and sending an acknowledgement message back to the packet sender including data identifying the position of the matched number in said list.

* * * * *